United States Patent
Streib

Patent Number: 5,929,533
Date of Patent: Jul. 27, 1999

[54] METHOD AND ARRANGEMENT FOR CONTROLLING IDLE OF A DRIVE UNIT

[75] Inventor: Martin Streib, Vaihingen, Germany

[73] Assignee: Robert Bosch GmbH, Stuttgart, Germany

[21] Appl. No.: 08/717,901

[22] Filed: Sep. 23, 1996

[30] Foreign Application Priority Data

Sep. 23, 1995 [DE] Germany .......................... 195 35 442

[51] Int. Cl.⁶ .................................................. F02M 3/07
[52] U.S. Cl. .................. 307/10.1; 123/339.1; 123/339.8
[58] Field of Search .......................... 180/69.3; 123/328, 123/339.1, 339.11, 339.12, 339.14–339.19, 480; 477/34, 112; 307/9.1, 10.1, 10.6, 10.7; 701/1, 36, 54, 58, 101, 113

[56] References Cited

FOREIGN PATENT DOCUMENTS 3832727  4/1990  Germany.

*Primary Examiner*—Albert W. Paladini
*Attorney, Agent, or Firm*—Walter Ottesen

[57] ABSTRACT

The invention is directed to a method and an arrangement for controlling the idle of a drive unit. In this method, the influence of the control on the drive power of the drive unit is limited when the vehicle is parked or when it begins to roll away. The limiting is carried out at least in the sense of reducing an increase in power.

9 Claims, 2 Drawing Sheets

5,929,533

METHOD AND ARRANGEMENT FOR CONTROLLING IDLE OF A DRIVE UNIT

The idle is electronically adjusted in modern control systems for drive units, especially for internal combustion engines. The various loads of the drive unit are considered and, in several operating states, the idle power, the idle torque or the idle rpm are increased. This takes place, for example, when switching on the compressor of a climate control unit, in order to obtain an improved cooling action or to improve the charge balance or the charging of the battery when there is an undervoltage or a negative charging balance of the battery. Such a control system is disclosed, for example, in German patent publication 3,832,727.

A situation can occur wherein the driver of a motor vehicle allows the engine to continue to run (for example, in order to continue to use the climate control unit) and with a gear engaged and then fixes the vehicle only utilizing the parking brake. Under these circumstances, it can occur that the parking brake is applied only so much that it holds the vehicle at that instant but is no longer capable of holding the vehicle when the engine power is somewhat increased, for example, in one of the above-mentioned operating situations. The parked vehicle can then begin to roll.

SUMMARY OF THE INVENTION

It is an object of the invention to provide measures which will prevent an unwanted rolling away of a parked vehicle.

The method of the invention is for controlling the idle of a drive unit of a vehicle wherein the motor power during idle is adjusted in accordance with at least one operating variable. The method includes the steps of: determining if a force connection is present in the drive train of the vehicle; determining if the vehicle is in a parked state; and, limiting the influence of the driving power via the motor power or motor rpm so that the driving power cannot assume higher values.

With the invention, an unwanted rolling away of a parked vehicle is effectively avoided.

It is especially advantageous that the increase in motor power is not carried out in operating situations wherein the parking brake is applied and the transmission is not in the neutral or park position.

A further advantage is provided in that the opening of the driver door is detected and the increase of the motor power is inhibited when the driver most likely has left the motor vehicle. In this way, the parking situation can be differentiated from a stop of the vehicle when the parking brake is applied such as at a traffic signal.

It is especially advantageous that the idle rpm is reduced somewhat after detecting the parked state. This ensures an additional measure of safety against an uncontrolled rolling away of the vehicle.

For the situation wherein there is an unwanted rolling away of the vehicle (when the parking brake is applied), it is especially advantageous that the idle rpm is reduced as far as possible in order to again stop the vehicle or to switch off the engine as required by the circumstances.

In addition or alternatively, in transmissions where the force connection can be interrupted by the transmission control, the force connection can be interrupted when the vehicle starts to roll or in a parked vehicle when the parking brake is actuated.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
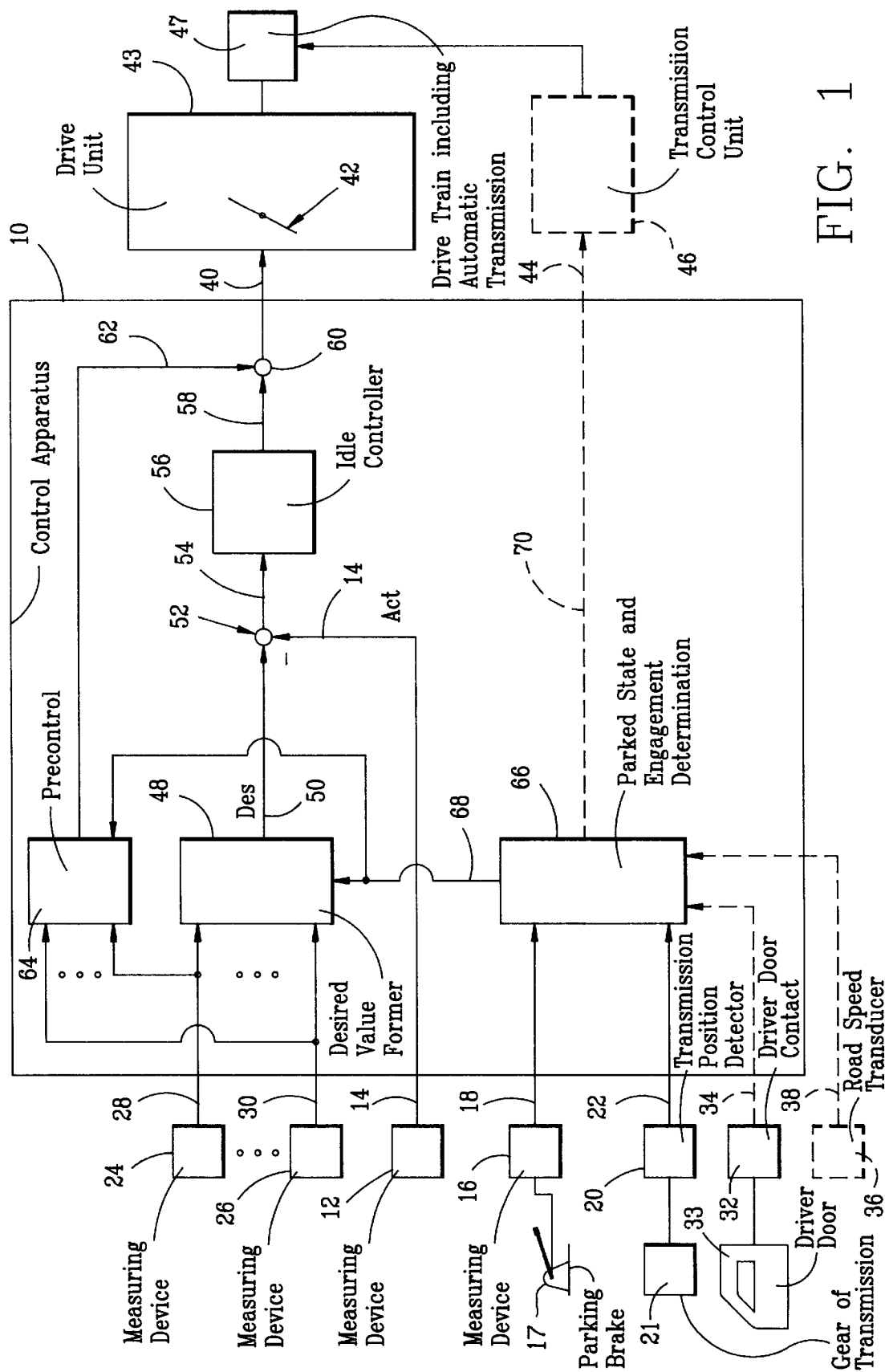
FIG. 1 shows an overview block diagram with respect to which the method and arrangement of the invention is explained; and, FIG. 2 shows an embodiment of the invention in the context of a computer program shown as a flowchart.

FIG. 1 shows an electronic control apparatus 10 for a drive unit of a motor vehicle. In FIG. 1, only those elements are shown which are needed to explain the method and arrangement of the invention. The blocks shown in FIG. 1 show function blocks as part of a program of at least one microcomputer which includes the control apparatus 10. Various measuring devices are provided for detecting operating variables of the drive unit and/or of the motor vehicle. These measuring devices are connected to the electronic control apparatus 10 via various input lines. Thus, measuring device 12 detects the motor rpm and is connected via line 14 to the control apparatus 10. Measuring device 16 detects the actuation of the parking brake 17 and is connected via line 18 to the control apparatus 10. The transmission position detector 20 supplies a signal when a gear 21 of the automatic transmission 47 is in neither the neutral position nor the park position and is connected to control apparatus 10 via line 22. Measuring devices 24 to 26 are identical to one or more of the measuring devices 12 to 20 depending upon the embodiment. Additional measuring devices can include, for example, a measuring device for detecting the motor temperature, the battery voltage, the command signal for switching on the compressor of the climate control system et cetera. Lines 28 to 30 lead to the control apparatus 10 from the measuring devices 24 to 26, respectively.

In a preferred embodiment, a contact 32 of a driver door 33 is provided from which line 34 leads to the control apparatus 10. Furthermore, a vehicle road speed transducer 36 is provided in an advantageous embodiment and is connected via line 38 to the control apparatus 10.

The control apparatus 10 controls the power of the drive unit via an output line 40. In a preferred embodiment of an internal combustion engine, the air supply to the engine is controlled preferably via an electrically actuable throttle flap 42 mounted in the intake system of the engine (drive unit 43). Furthermore, in a preferred embodiment, an output line 44 is provided which intervenes in the transmission control unit 46 to control the automatic transmission. In FIG. 1, the drive train and automatic transmission are represented schematically by block 47.

In addition to an internal combustion engine, the drive unit can be an alternate drive concept such as an electric motor wherein the above-described situation can occur.

In the preferred embodiment, an idle rpm controller with precontrol can be utilized for setting the idle power.

In the preferred embodiment, the input lines 28 to 30 lead to a desired-value former 48. In dependence upon the supplied operating variables (such as motor temperature, command signal for switching on the climate control system, battery voltage, motor rpm, engine load et cetera), the desired-value former 48 generates a desired value for the idle rpm in accordance with pregiven tables, characteristic lines, characteristic fields or computations. The output line 50 of the desired-value former 48 leads to the comparator 52 to which the input line 14 is also connected. The output line 54 of the comparator 52 leads to a controller 56 having an output line 58 connected to an adding position 60.

A line 62 from a precontrol element 64 is also connected to the adding position 60. Operating variables are supplied to the precontrol element 64 via lines 28 to 30 to form a precontrol value. The output line 64 of the adding position 60 is the output line 40 of the control apparatus 10 to adjust the throttle flap 42.

In addition, an element 66 is provided which recognizes a parked vehicle having an actuated parking brake. The input lines 18 and 22 are connected to this element and, in a preferred embodiment, the lines 34 and/or 38 are also connected thereto. The output line 68 of element 66 leads to the desired-value former 48 as well as to the precontrol 64, as may be required. In an advantageous embodiment, the element 66 has, in the alternative or as a supplement, an output line 70 which defines the output line 44 to the electronic transmission control 46.

The operation of the idle rpm control shown in FIG. 1 is known per se. The desired-value former 48 forms an rpm desired value, which is to be adjusted, in dependence upon the supplied operating variables. The desired-value former 48 includes a corresponding characteristic field, a corresponding table, corresponding characteristic lines or calculation specifications. Suitable operating variables are motor temperature, battery voltage, command signals of ancillary consumers such as the climate control unit, motor fan et cetera. The desired-value former 48 outputs the determined rpm desired value via line 50 to comparator stage 52.

In the comparator stage 52, the control deviation is formed by subtracting the actual value of the motor rpm, which is detected by the rpm sensor 12, from the rpm desired value. The control deviation is transmitted via the line 54 to the controller 56. The controller 56 forms an output signal in accordance with its pregiven control strategy (such as a PID) in the sense of the actual value approaching the desired value.

A so-called precontrol 64 is provided to relieve the controller 56 in that the precontrol takes over tasks of the controller. As a rule, at least several of the operating variables, which form the basis of the desired-value formation, and, if required, also other variables, which are not applied to form the desired value, are supplied to the precontrol. On the basis of pregiven characteristic lines, characteristic fields, tables or computation requirements, the precontrol 64 determines a precontrol value which is outputted as an output signal via the line 62.

Via the precontrol, the air supply is changed in such a manner that the engine rpm is essentially adjusted to the pregiven desired value notwithstanding the changed load conditions. Suitable variables on which the precontrol is based therefore include: command signals from ancillary consumers, battery voltage, charging state of the battery, motor temperature, et cetera. In the adding position 60, the controller output signal and precontrol output signal are added and the sum of the two signals is outputted via the line 40 to adjust the air supply to the internal combustion engine. Here the adjustment is made via the throttle flap.

The above-described idle rpm control increases the rpm of the motor in idle and therefore the motor power in dependence upon specific operating variables, for example, when switching on the compressor of a climate control system, when there is an undervoltage or negative charging balance of the battery et cetera. If the vehicle is parked with the drive train engaged (transmission not in the neutral or park positions) and with the motor running, this power increase leads also to an increase of the drive force whereby the parked vehicle can start to move away in an unwanted manner.

In addition to the idle rpm control described, a control of the torque, the air quantity, the air mass, the power of the motor et cetera can be utilized to control the idle of the motor. The desired value, actual value and precontrol value then exhibit corresponding magnitudes.

In element 66, a vehicle is detected which is parked with the drive train engaged. In a preferred embodiment, a moving away of the vehicle from the parked position is determined in this operating state. For this purpose, and for the first case, data as to the position of the selection lever of the transmission is supplied to the element 66 via the line 22 and data via the actuation of the parking brake via line 18. In the preferred embodiment, both sets of data are determined via corresponding switching elements which, for example, generate a corresponding signal when the parking brake is actuated or when the gear position is engaged.

In an advantageous embodiment, the signal of a driver-door contact is supplied via the line 34 to the element 66. In another advantageous embodiment, a road speed signal is transmitted via the line 38.

In the preferred embodiment, the element 66 determines (for example via an AND-logic connection) whether the parking brake is actuated and the transmission is not in the neutral or park position and instead in the driving position. If this is the case, then the element 66 outputs an appropriate signal to the desired-value former 48 and/or precontrol 64 via the line 68. This signal causes the desired value (that is, the precontrol value or the present value) to be fixed as the upper limit value. This value is then not exceeded, for example, because of switching on the compressor of the climate control system or when an undervoltage occurs. In this way, the idle control is inhibited from increasing the motor power. A change of the motor power in a direction of lower values continues to be possible.

In an advantageous embodiment, a driver-door contact signal can be processed in addition to the parking brake signal and transmission signal. In this case, the element 66 generates (via a logic connection) an output signal only then when, in addition to the actuated parking brake and the drive position of the transmission, the opening of the driver door is detected. Blocking the idle control takes place in this case only when the driver, in all probability, has left the vehicle.

In a further advantageous embodiment, the output signal of the element 66 does not only trigger an upper limiting of the idle control but a slight reduction of the rpm (for example, by an amount of 30 to 50 rpm). This is carried out in an advantageous manner by a corresponding reduction of the desired value. In this context, it should be noted that the reduction of the rpm only takes place after a predetermined time duration after detection of the parking state (for example, several seconds) so that the parking state is clearly established.

In another embodiment, the influence of the power increase by the idle control for a parked vehicle on the drive of the vehicle is avoided in that, for a parked vehicle, the element 66 influences an electronic transmission control via the line 70 in such a manner that the force connection between motor and output of the vehicle is interrupted.

In addition to the above-described measures during the parking state of the vehicle, and in a preferred embodiment of the invention, the corresponding measures can be carried out (supplementary or alternatively) when the vehicle starts to roll away from the parking position in an unwanted manner. For this purpose, the road speed signal is used, which is supplied to the element 66 and from which, by comparison to a value representing the standing vehicle, the rolling away of the vehicle from the parking position is recognized. Via the threshold value comparison and incorporation into the logic operation in the element 66, the idle rpm is reduced via line 68 by a corresponding control of the precontrol and/or desired value for reducing the motor power. Alternatively, the force connection is interrupted by controlling the transmission.

Figure 2:
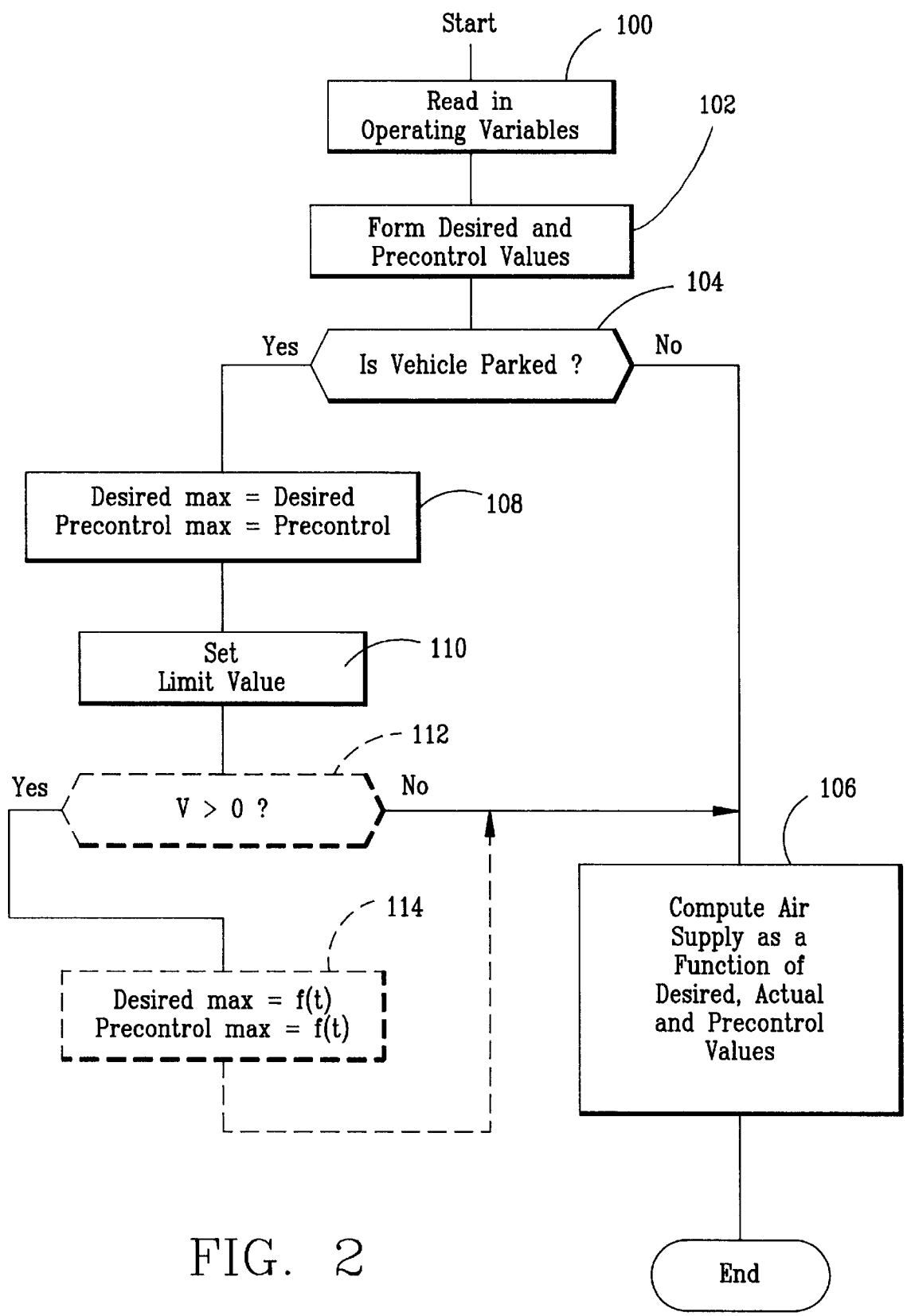

In FIG. 2, the realization of the preferred embodiment is shown with reference to a flowchart wherein there is an intervention in the idle control. The program is that of a microcomputer which realizes the elements shown in FIG. 1.

After the start of the subprogram and at pregiven time points in the first step 100, the following are read in: the operating variables evaluated for idle control, command signals from ancillary consumers, motor rpm, battery voltage, charging state of the battery, motor temperature et cetera. Furthermore, the operating variables are read in which are necessary to determine the parking vehicle or the vehicle which is rolling away. These operating variables are: the parking brake actuating signal, transmission signal and, in an advantageous embodiment, the driver-door contact signal and the road speed signal. In the next step 102, the desired and precontrol values are formed on the basis of selected operating variables.

In the next inquiry step, a determination is made as to whether the vehicle is parked on the basis of the parking brake signal and transmission signal and, if necessary, the driver-door contact signal, as explained above, in accordance with an AND-logic operation. If this is not the case, and in accordance with step 106, the air supply to be adjusted is computed on the basis of the desired, actual and precontrol values. Thereafter, the program is ended and repeated at a pregiven time.

If the vehicle is detected as parked in step 104, when this state is detected for the first time and, as may be required, after a pregiven delay time, the limit value for the desired value and, if required, the limit value for the precontrol value are set as the present values in accordance with step 108. This takes place only after a first detection of the parked state. The maximum values remain during a parked state of the vehicle.

In the next step 110, the desired value and, if required the precontrol value determined in the step 102 with each program runthrough is limited to this maximum value for the parked state. Thereafter, in the preferred embodiment, the air supply is adjusted in accordance with step 106.

In a preferred embodiment, and in lieu of the determined desired or precontrol values of the boundary value, a value is set in step 108 which is reduced by a pregiven value δ. This leads to a reduction of the idle rpm with the start of the parked operating state, preferably after a delay time has run after entry into the parked operating state.

In a preferred embodiment, and supplementary to step 110 or alternative to the steps 108 to 110, a determination is made in inquiry step 112 as to whether the vehicle is rolling. This takes place with a comparison of the vehicle speed to a pregiven limit value especially to 0. If the vehicle is standing (vehicle speed 0), step 106 is carried out. If the vehicle is rolling (vehicle speed >0 or for a corresponding sensor <0), the idle rpm is reduced in accordance with step 114 by a corresponding time-dependent control of the desired or precontrol value. This can be carried out until the vehicle comes to a standstill or until the engine stops running in accordance with a pregiven time function, for example, a linear time function.

The automatic transmission is influenced in lieu of influencing the idle controller in another advantageous embodiment. In this case, in lieu of steps 108 and 110, a drive signal is outputted to the transmission control unit which leads to an interruption of the force connection. Alternatively or in addition, this is carried out in lieu of step 114 when the vehicle begins to roll away.

It is understood that the foregoing description is that of the preferred embodiments of the invention and that various changes and modifications may be made thereto without departing from the spirit and scope of the invention as defined in the appended claims.

What is claimed is:

1. A method for controlling the power of a drive unit of a vehicle having drive wheels and a drive train including an automatic transmission, said drive unit imparting power to said drive train, which, in turn, imparts drive power to said drive wheels when said drive train provides a force-transmitting connection to said drive wheels, said vehicle having a parking brake and an idle controller operatively connected to said drive unit to affect said power during idle, the method comprising the steps of:

detecting whether said vehicle is parked by determining whether said vehicle is parked by determining whether said parking brake is engaged and if a gear of said automatic transmission is engaged and, if so; generating an output signal indicative thereof; and, utilizing said idle controller in response to said output signal to limit at least an increase in the power of said drive unit or an increase in the rpm of said drive unit while said vehicle is parked with said force-transmitting connection present thereby preventing an unwanted movement of said vehicle away from the parked position.

2. The method of claim 1, wherein said vehicle includes a driver door; and, said method comprises the further step of utilizing contact means to detect if the driver door is open and supplying a signal of said contact means to said idle controller whereby said idle controller operates on said drive unit to limit said power or said rpm.

3. The method of claim 1, comprising the further step of influencing the automatic transmission in such a manner that the force-transmitting connection in the drive train is interrupted when the vehicle is parked or undergoes an unwanted movement away from the parked position.

4. The method of claim 1 wherein said vehicle has a road speed transducer; and, said method comprises the further step of detecting the road speed with said road speed transducer and providing a road speed signal; and, logically combining said road speed signal to detect an unwanted movement of the vehicle away from the parked position.

5. The method of claim 4, comprising the further step of influencing the idle controller to effect a reduction of motor power or motor rpm when there is an unwanted movement of the vehicle away from the parked position.

6. The method of claim 1, wherein said drive unit is a motor including a control apparatus for controlling said power and said control apparatus includes said idle controller; and, wherein the method includes the step of inhibiting said idle controller so that said power or said rpm cannot be increased.

7. The method of claim 6, wherein said idle controller has a desired value and a precontrol value; and, said method comprises the further step of limiting the desired value and, if required, the precontrol value of the idle controller to a maximum value when the vehicle is parked.

8. The method of claim 7, wherein the maximum value is the desired value or the precontrol value which is present when the park state is first recognized, if required, after a delay time has run.

9. An arrangement for controlling a drive unit of a vehicle having drive wheels and a drive train including an automatic transmission, said drive unit imparting drive power to said drive train, which, in turn, imparts drive power to said drive wheels when said drive train provides a force-transmitting connection to said drive wheels, said vehicle having a parking brake and an idle controller operatively connected to said drive unit to affect said power during idle, the arrangement comprising:

means for detecting whether said vehicle is parked by determining whether said parking brake is engaged and if a gear of said automatic transmission is engaged and, if so, generating an output signal indicative thereof; and, means responding to said output signal for limiting said power with said idle controller by limiting at least an increase in the power of said drive unit or an increase in the rpm of said drive unit while said vehicle is parked with said force-transmitting connection present thereby preventing an unwanted movement of said vehicle away from the parked position.

* * * * *